United States Patent [19]

Langenhorst

[11] Patent Number: 4,601,189

[45] Date of Patent: Jul. 22, 1986

[54] METHOD OF AND TOOL FOR MITERING FRAME MEMBERS

[75] Inventor: Christoph Langenhorst, Bad Sassendorf, Fed. Rep. of Germany

[73] Assignee: Walpat AG, Basel, Switzerland

[21] Appl. No.: 639,366

[22] Filed: Aug. 9, 1984

[30] Foreign Application Priority Data

Aug. 10, 1983 [DE] Fed. Rep. of Germany ....... 3328804

[51] Int. Cl.[4] .............................................. B21D 28/00
[52] U.S. Cl. ........................................ 72/326; 72/325; 72/464
[58] Field of Search .................. 72/325, 326, 332, 464

[56] References Cited

U.S. PATENT DOCUMENTS 3,074,150 1/1963 Berg ...................................... 72/325
4,509,355 4/1985 Oishi ..................................... 72/464

FOREIGN PATENT DOCUMENTS 147454 4/1981 German Democratic Rep. ... 72/326
151599 10/1981 German Democratic Rep. ... 72/326

*Primary Examiner*—W. D. Bray
*Attorney, Agent, or Firm*—Karl F. Ross; Herbert Dubno

[57] ABSTRACT

A tool for the mitering of frame members has a lateral shoulder cooperating with a lateral guide for the punch so that a vertical bending edge of the latter deform the trim flange of a profile against a rounded portion of a cutting die on which the profile is supported to form a rounded trim edge, simultaneously with the mitering operation.

12 Claims, 6 Drawing Figures

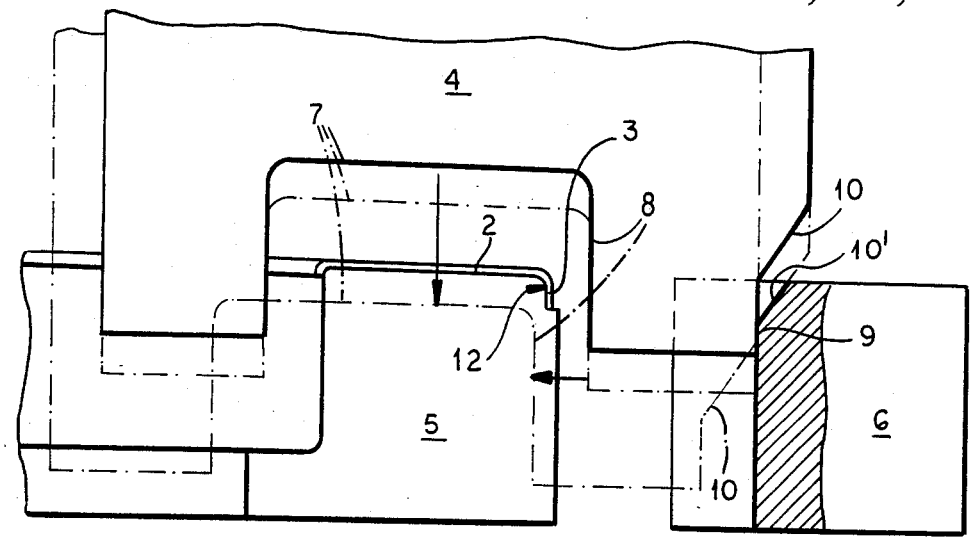
FIG.3
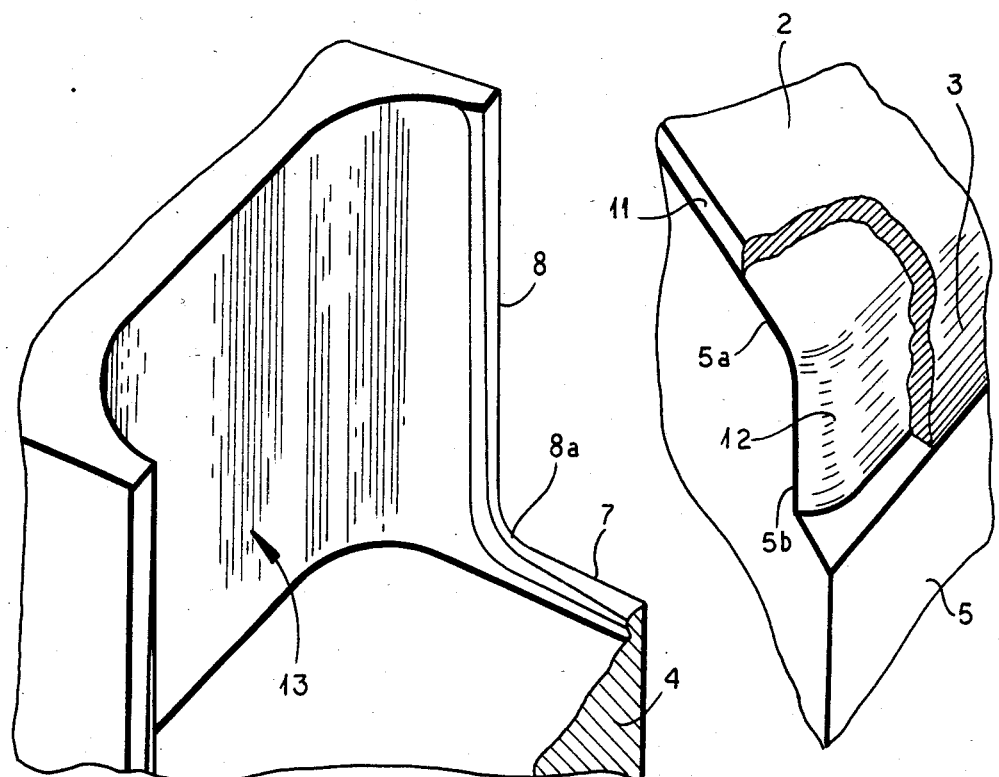
FIG.4
FIG.5

METHOD OF AND TOOL FOR MITERING FRAME MEMBERS

FIELD OF THE INVENTION

Our present invention relates to the mitering of frame members and, more particularly, to a tool and method for the mitering of doorframe members.

BACKGROUND OF THE INVENTION

Frame members which are to be mitered can include doorframe members, window frame members and the like composed of steel, aluminum and even synthetic resin materials. These members may be fabricated from raw material in the form of a "profile", i.e. a length of the material which is of uniform cross section and which may comprise one or more webs and flanges angularly adjoining one another and at least one of which can form a trim flange.

When the profile is formed from aluminum or synthetic resin material, it is generally extruded, and when it is formed from steel, it is generally formed by rolling.

The ends of each length are originally perpendicular to the longitudinal edges of the profile and for assembling a frame from members cut to length from the profiles, it is necessary to miter these lengths, i.e. cut the ends thereof at a bias to the longitudinal edges, generally at an angle of 45°.

The mitering of frame profiles to size has generally been carried out by a sawing operation heretofore. This is disadvantageous for various reasons. For example, it forms burrs and especially sharp edges which along the trim flange lead to a poor finish of the frame.

At least in part this may be because the sharp trim edges do not always meet with precision during the mounting of the frame even when the frame members form part of a prefabricated frame structure adapted to be inserted in a door buck or frame opening. Some leeway must generally be provided to accommodate the frame to the frame opening and hence even where the frame members are connected together for use with prehung doors, some mobility may be required.

Furthermore, the sharp edges may introduce handling problems especially at the trim edge or flange.

Accordingly, these earlier systems resulted in time consuming and expensive deburring and finishing operations even where the trim edge was to be welded to the trim edge of an adjoining profile in a prehung door arrangement.

Furthermore, the sawing operation is time consuming because the saw cutting of a workpiece is comparatively slow, and gives rise to saw wear requiring frequent replacement or sharpening of the tool.

It has also been proposed to miter frame members from such profiles by a stamping or punching operation. While this eliminates the tool wear and burr problems previously mentioned, the desired rounded contour of the trim edge cannot be obtained by these earlier stamping operations and, indeed, problems may be encountered in the deformation of the profile between long-cut regions at which two frame members are to adjoin in mirror-symmetrical relationship and the trim edge.

OBJECTS OF THE INVENTION

It is the principal object of the present invention to provide an improved tool for the stamping or punching of frame members and especially doorframe members which ensures a burr-free mitering of a frame profile with precise dimensions while simultaneously forming an appropriate round at the trim edge so that frame finishing is facilitated.

Another object of this invention is to provide a method of mitering profiles to form doorframe members and the like so that problems characterizing earlier systems are obviated.

Still another object of this invention is to provide a mitering tool which can be used in the stamping of mitered doorframe sections and which will obviate the difficulties of the methods previously described.

SUMMARY OF THE INVENTION

These objects and others which will become apparent hereinafter are attained, in accordance with the present invention, with a tool for the stamping of profiles of the type described to form frame members by mitering them in which the punch not only is formed with a cutting edge, but has extending generally transversely to this cutting edge at least one bending surface which cooperates with the matrix or die-supporting profile so as to bend the latter and form a round at its trim edge, means being provided to displace the punch during its mitering cut displacement perpendicular to the web of the profile, also with a component transverse to this cutting direction so that this lateral movement of the punch will, utilizing the bending portion of the punch, impart the desired rounded contour to the trim edge at least at the corner formed between the trim flange and the aforementioned web.

In other words with the system of the invention, the cutting punch simultaneously forms a bending stamp or ram and the punch is not only guided for vertical movement to effect the cutting operation but also has a substantially vertical bending edge.

According to a feature of the invention, the cutting punch forming the tool of the invention is provided with a lateral guide and the punch and guide have mutually engaging guide surfaces which, as the punch descends, laterally shift the punch to effect a combined cutting and bending movement.

The punch may thus be provided with a beveled, chamfered or other guide shoulder inclined to the vertical and the guide may be provided with a complementary chamfered, beveled or otherwise inclined surface engaging this shoulder so that the lateral movement induced by the cooperation of these surfaces brings the vertical bending edge of the tool to bear against the trim flange to thereby impart the round in the form of a bend to the trim edge. Naturally, the inclined surfaces of the guide and of the tool can be conical.

Consequently the descent of the punch does not carry out a simple stamping cut of the profile in the mitering operation, but rather effects a bending operation as well and indeed superimposes a lateral bending upon the transverse cutting of the punch.

This is accomplished by having the beveled shoulder of the punch engage the inclined guide surface of the associated guide member parallel to the cutting edge and thereby enables the cutoff portion of the profile to be separated simultaneously with the transverse cutting of the trim flange and the rounding of the trim edge.

At the end phase of the cutting operation, the lateral cutting edge of the tool becomes effective after the bending edge has deflected the trim flange inwardly to sever the trim flange and impart the round to the trim edge as previously described. As a consequence, a rounded trim corner can be obtained which is surprisingly free from burrs.

According to the invention, therefore, the combined cutting and bending operation can utilize a cutting matrix or die upon which trim flange is supported and which can be rounded to support the profile against both the bending and cutting action. The cutting edge and the bending edge form practically a right angle in the same plane.

The tool has been found to be effective for steel, aluminum and synthetic resin frame members.

The punch, according to the invention can be formed along the inner side of the bending edge with a cavity or recess for partly receiving material to be severed from the profile or to be bent during the bending operation. During the bending operation a portion of the material in the region of the trim edge is initially bend inwardly and only then is cut away during the lower lying cutting edge.

An especially effective rounding of the trim corner or edge or the transition region between the miter edge and the trim edge is obtained when the bending edge is formed as a rounded edge.

Preferably the punch is formed on both of its broad sides with the aforementioned cutting edge and upon one lateral side with the beveled guide shoulder, each of the cutting edges being associated with a respective bending edge and the aforementioned hollow or cavity being provided between two cutting edges so that material cut from two profiles fed in opposite directions to the punch may be partly received therein. In this manner we can miter two profiles to form mating frame members.

According to another feature of the invention, the beveled guide shoulder on the punch or its slope is longer than the cutting or bending stroke and the shoulder is guided at a correspondingly beveled guide surface on the lateral guide member. The cutting die can form a guide or fixing member for the profile and can be the necesssary element for fixing and holding the profile in place during mitering.

The tool of the invention has been found to be highly effective for the mitering of frame members and especially doorframe members to yield mitered joints which are free from burrs and in which the trim edge is effectively rounded during the mitering operation. After assembly of the joint, operations for rounding the trim edge are thereby eliminated and the finishing of the frame requires less work than has hitherto been the case. By comparison to conventional sawing operations a more rational and rapid fabrication of the frame sections is obtained and there are no difficulties involved in manipulating the frame members during mounting or the like. The invention can also be used in the fabrication of two-part frames which can be utilized for wall openings of different thicknesses.

BRIEF DESCRIPTION OF THE DRAWING

The above and other objects, features and advantages of the present invention will become more readily apparent from the following description reference being made to the accompanying drawing in which:

FIG. 3 is a view similar to FIG. 2 but taken from the opposite side and with parts broken away showing the tool in solid lines before the commencement of the cutting and bending operation in dot-dash lines in subsequent positions during the cutting and bending operation;

FIG. 4 is a fragmentary detail view showing the relationship of the bending and cutting edges of the tool;

FIG. 5 is a detail view with parts broken away showing the rounded portion of the cutting die.

SPECIFIC DESCRIPTION

Figure 1:
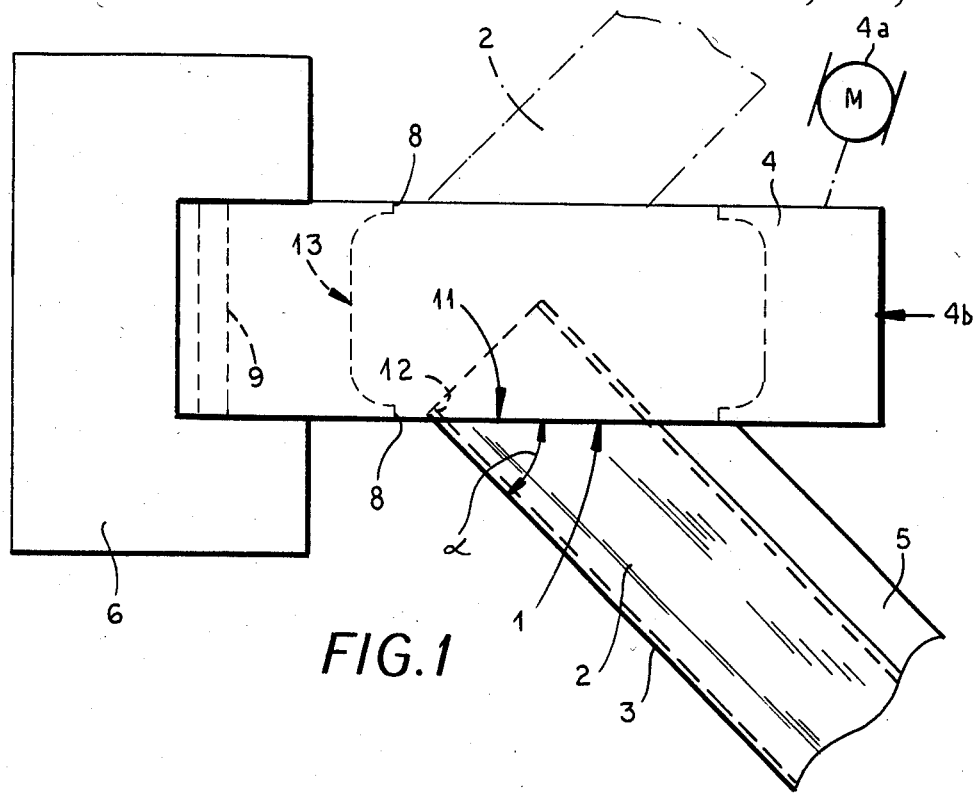
FIG. 1 is a plan view from above showing the mitering of frame profiles according to the invention.
Figure 2:
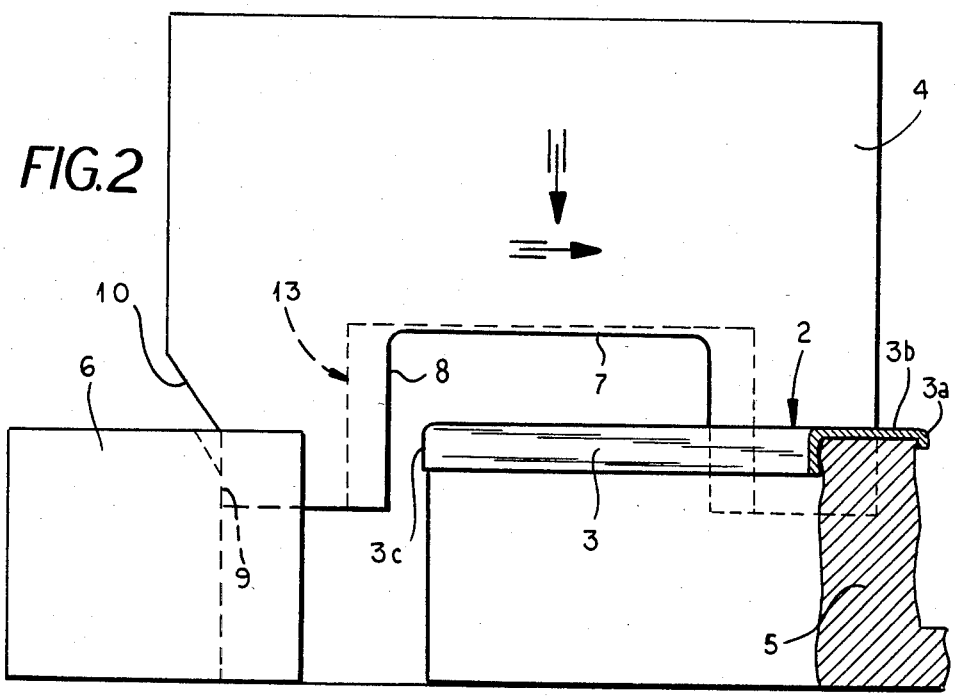
FIG. 2 is a front elevational view of the tool of FIG. 1 before the begining of a cutting and bending operation according to the invention.

In FIGS. 1-5 we have shown a tool for the mitering of frame members, especially tool frame members from profiles generally represented at 2, the miter line being shown at 1 in FIG. 1 whereas the cut edge at which the mitered frame members are to adjoin in mirror-symmetrical relationship has been shown at 11.

The profile 2 may have a trim flange 3 which hangs over the cutting die 5, an internal flange 3a and a web 3b connecting these flanges. The leading edge 3c of the trim flange 3 will be referred to as the trim edge because, in the course of the operations to be described, it is bent inwardly to form a round corresponding to the round or rounded corner 12 of the cutting die 5. The latter has a miter cutting edge 5a adjoining a flange cutting edge 5b cooperating with the edges 7 and 8 of the punch to be described.

The punch 4 of the tool is vertically shiftable by a punch drive represented at 4a in FIG. 1 and not otherwise illustrated. A yieldable lateral guide 4b is also provided to hold the punch in the lateral guide 6. The members 4a and 4b are designed to allow the composite movement of the punch as it is driven downwardly and return upwardly in the manner to be described. The punch 4 has a substantially horizontal cutting edge 7 and is simultaneously formed as a bending stamp. To this end, the substantially vertical bending edge 8 adjoins the cutting edge 7 in a rounded portion 8a.

The punch 4 and its guide 6 have complementary guide surfaces which can include (FIG. 3) a beveled guide shoulder 10 on the punch and a complementary bevel 10' on the guide 6 which cooperate to displace the punch 4 to the left (FIG. 3) or to the right (FIG. 2) as the punch descends.

Figure 6:
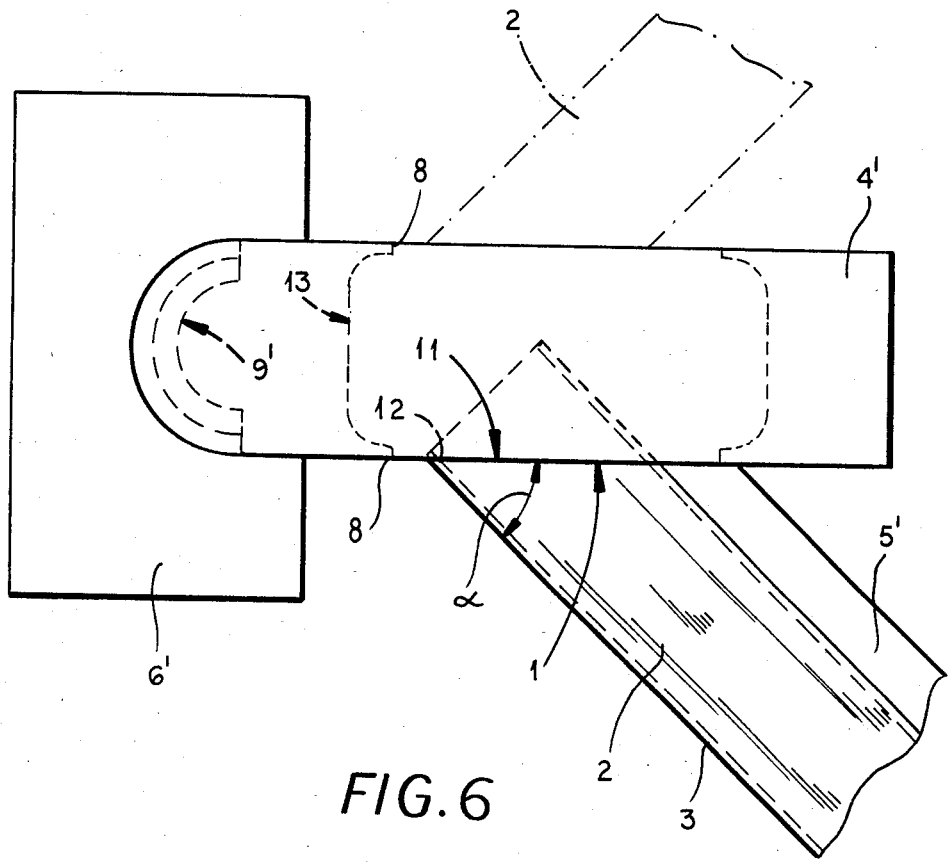
FIG. 6 is a view similar to FIG. 1 but illustrating an embodiment in which the inclined holder and the complementary guide surface of the lateral guide for the cutting tool are conical.

The guide surfaces may also be conical as represented in FIG. 6 at 9' for the punch 4' and the guide 6'.

The shoulder 10 and its complementary bevel 10' superimpose a lateral bending operation upon the vertical cutting operation. The guide surfaces 9, 10 and 10' are practically orthogonal to the cutting and bending edges 7, 8 so that the descending punch 4 has a combined vertical and horizontal movement, i.e. an inclined movement with vertical and horizontal components.

The punching die 5 in the transition region between the cut edge 11 for the miter and the cutting edge at which the trim flange 3 is severed from the waste, has a round or a rounded corner 12 and lies at the miter angle α relative to the punch 4 or its cutting edge 7 and bending edge 8.

The punch 4 has along the inner side of the bending edge 8 a recess or cavity 13 for partly receiving material which is cut away. The bending edge is formed as a rounded edge.

As is also apparent from FIGS. 1 and 6, the punch 4 or 4' can be used for the cutting of two profiles 2 simultaneously and thus has its cutting and bending edges duplicated on both sides.

The beveled guide shoulder 10 or its inclination is wider than the cutting and bending stroke. The guide surface of member 6 and 6' can be shorter as long as it has the appropriate inclination and engages the shoulder during the entire bending and cutting stroke. The cutting die 5 simultaneously forms a guide and fixing support for the profile 2 along which the latter can be shifted and which can hold the profile during the cutting and bending operating.

When the profile is fed to the punch, the latter is vertically reciprocated and as the miter cut 11 is made (see dot-dash lines in FIG. 3), the punch is shifted laterally by the cooperation of the guide surfaces 10 and 10', thereby bringing the edge 8 to bear against the trim flange 3, bending the latter inwardly along the rounded portion 12 of the die and thereafter laterally severing the waste from this profile. With the mitering operation, a rounded trim edge is thereby formed.

As can be seen from FIGS. 1 and 6, moreover, the cutting die 5 or 5' is oriented relative to the punch 4 at the mitering angle $\alpha$.

We claim:

1. A tool for forming a miter on a profile having a web in which a miter cut is to be formed at a miter angle and a trim flange adapted to have a trim edge adjacent the miter cut of the web in the production of a frame member, said tool comprising:
   a vertically displaceable punch having a substantially horizontal cutting cut adapted to form said miter edge, and a bending edge substantially perpendicular to said cutting edge and adapted to engage said trim flange and bend the same to round said trim edge;
   a guide engaging said punch along a lateral edge thereof and formed with an inclined guide surface, said lateral edge of said punch being formed with an inclined guide shoulder engageable with said guide surface during vertical displacement of said punch to shift said punch laterally and bring said bending edge to bear against said trim flange; and
   an elongated cutting die for supporting said profile and provided with a cutting edge cooperating with said cutting edge of said punch to form said miter cut in said web and having a rounded portion cooperating with said bending edge to round said trim edge upon the lateral displacement of said punch, said cutting die being oriented relative to said punch at the miter angle.

2. The tool defined in claim 1 wherein said punch is formed at least along an inner side of said bending edge with a cavity for at least partly receiving waste severed from said profile.

3. The tool defined in claim 1 wherein said bending edge is a rounded edge.

4. The tool defined in claim 1 wherein said punch has a cutting edge and bending edge duplicated on opposite broad sides thereof for the mitering of profiles in mirror-symmetrical relationship on opposite sides thereof, a cavity being formed between said bending edges to receive waste separated from the respective profiles.

5. The tool defined in claim 1 wherein said shoulder is wider than the cutting and bending stroke of said punch.

6. The tool defined in claim 1 wherein said cutting die is shaped to fit complementarily into said profile and forms a guide and fixing member for said profile during the mitering thereof.

7. A method of mitering a frame profile having a web in which a miter cut edge is to be formed at a miter angle to a longitudal edge of the profile and having a trim flange at a right angle to said web adapted to be formed with a rounded trim edge adjacent said miter edge, said method comprising the steps of:
   feeding said profile at said miter angle along a cutting die having a cutting edge corresponding to said miter edge and a rounded portion adjacent said cutting edge against which said trim flange can be bent, toward the path of a vertically displaceable punch having a cutting edge cooperating with said cutting edge of said die to form said miter edge, and a vertical bending edge adjoining said cutting edge of said punch for bending said trim flange to form said trim edge; and
   laterally guiding an inclined shoulder of said punch on a fixed guide engaging a lateral edge of said punch to impart a lateral movement to said punch and bring said bending edge to bear against said trim flange and bend the latter before said trim flange is severed from waste of said profile to form said trim edge.

8. The method defined in claim 7 wherein said punch is formed at least along an inner side of said bending edge with a cavity for at least partly receiving waste severed from said profile.

9. The method defined in claim 7 wherein said bending edge is a rounded edge.

10. The method defined in claim 7 wherein said punch has a cutting edge and bending edge duplicated on opposite broad sides thereof for the mitering of profiles in mirror-symmetrical relationship on opposite sides thereof, a cavity being formed between said bending edges to receive waste separated from the respective profiles.

11. The method defined in claim 7 wherein said shoulder is wider than the cutting and bending stroke of said punch.

12. The method defined in claim 7 wherein said cutting die is shaped to fit complementarily into said profile and forms a guide and fixing member for said profile during the mitering thereof.

* * * * *